April 7, 1959 O. D. WILLIAMS Re. 24,626

SELF-ADJUSTING CAM BEARING OR BUSHING KNOCKER AND INSTALLER

Original Filed Feb. 25, 1952

INVENTOR.
OLLIE D. WILLIAMS
BY
Patrick D. Beavers
ATTORNEY

United States Patent Office

Re. 24,626
Reissued Apr. 7, 1959

24,626

SELF-ADJUSTING CAM BEARING OR BUSHING KNOCKER AND INSTALLER

Ollie Dee Williams, Kress, Tex.

Original No. 2,775,025, dated December 25, 1956, Serial No. 273,314, February 25, 1952. Application for reissue October 31, 1957, Serial No. 694,701

2 Claims. (Cl. 29—275)

Matter enclosed in heavy brackets [ ] appears in the original patent but forms no part of this reissue specification; matter printed in italics indicates the additions made by reissue.

The invention relates to means for the installation and removal of cam bearings or bushings such as are employed in conjunction with internal combustion engines.

The principal object of the present invention is to provide a self-adjusting cam bearing or bushing knocker and installer which will take the place of approximately ninety percent of present day job requirements, this in view of the present necessity of employing from fifteen to twenty different knockers to cover the range of jobs that present themselves to the average automobile repair establishment.

Another important object of the invention is to provide a universal knocker and installer for cam bearings and bushings, capable of being manufactured and retailed at a low monetary figure.

Still another object of the invention is to provide a tool of the character stated which will be positive acting and nonsusceptible to the ready development of defects.

These and various other objects and advantages of the invention will become apparent to the reader of the following description.

Figure 1:
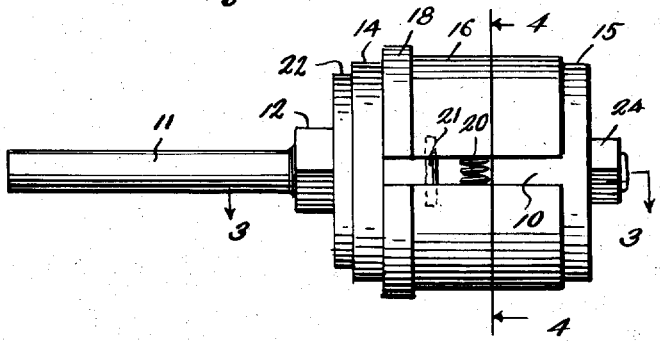
Figure 1 is a side elevational view of the tool.

Referring to the drawing wherein like numerals designate like parts, it can be seen that the present invention includes an elongated shaft which has the portions 10, 11, between which portions is a polygonal shoulder 12.

Figure 2:
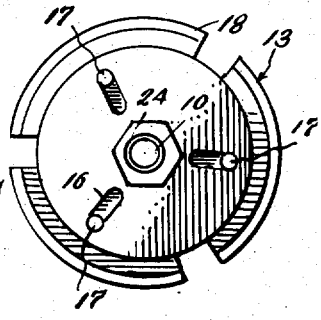
Figure 2 is an end elevational view of the tool.

The tool includes a head portion generally referred to by numeral 13 and this is made up of a pair of end plates 14, 15 having radial slots 16 therein, as is clearly shown in Figure 2.

The head also includes a plurality of segmental blocks 16, each of which has a pintle 17 at each end thereof and these pintles are slidably disposed in corresponding slots 16 of the end plate 14, 15. The outer surfaces of the blocks 16 are curved as is apparent and the inner end of each of these blocks has a transverse outstanding stop rib 18 as is clearly shown in Figures 3 and 4.

The blocks 16 have opposed faces 19 and each face has a recess therein for receiving the corresponding end of a compression spring 20 and these blocks are further equipped with guide means to the extent that each block has an outstanding pin 21 adjacent to the spring 20 and rides in an opening in the face 19 of a companion block 16. Thus guide means is provided between the blocks 16 in addition to the spring means 20 which serves to spread the blocks apart.

The end plates 14, 15 have central openings therein for receiving the portion 10 of the shaft. Interposed between the end plate 14 and the shoulder 12 is a washer 22. The end portion of the shaft which extends through the end plate 15 is threaded as at 23 and a nut 24 is provided on this threaded portion to prevent the head assembly 13, becoming displaced.

Figure 3:
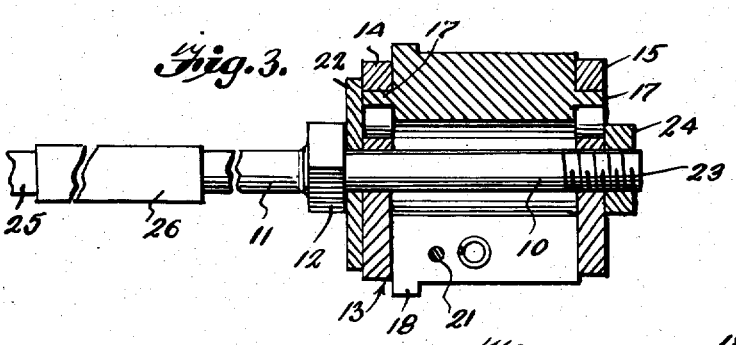
Figure 3 is a section taken substantially on line 3—3 of Figure 1.
Figure 4:
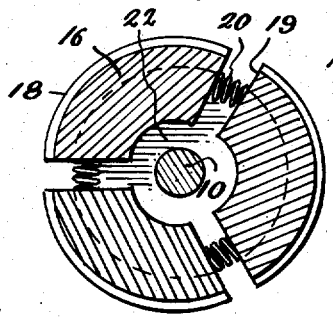
Figure 4 is a cross section taken on line 4—4 of Figure 1.
Figure 6:
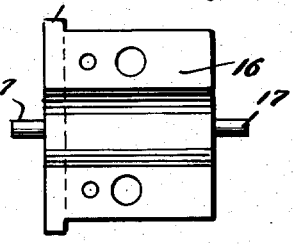
Figure 6 is an inside elevational view of one of the segments.
Figure 5:
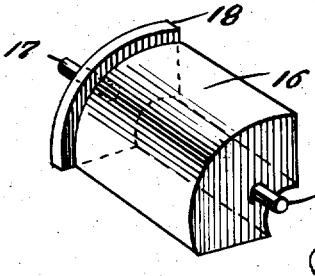
Figure 5 is a perspective view of one of the segments.
Figure 7:
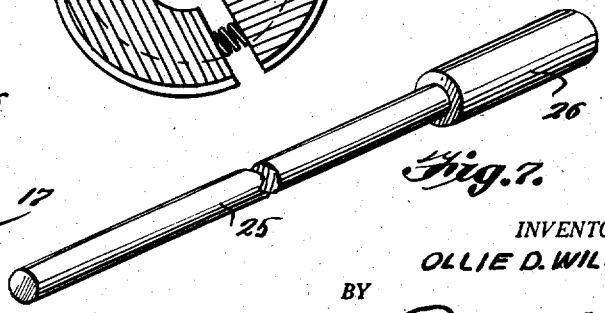
Figure 7 is a fragmentary perspective view of the handle.

Numeral 25 denotes an elongated handle having a socket 26 at one end which fits over the portion 11 of the shaft, as in the maner shown in Figure 3.

It can now be seen that this tool can be applied to any cam bearing or bushing structure with the purpose of removing or installing the cam bearing or bushing and in view of the resilient mounting of the segmental block 16, the tool will self-adjust itself to practically any conventional size bearing or bushing.

While the foregoing description sets forth the invention in specific terms, it is to be understood that numerous changes in the shape, size and materials may be resorted to without departing from the spirit and scope of the invention as claimed hereinafter.

Having described the invention what is claimed as new is:

*1.* A bushing knocker and installer comprising an elongated shaft having a threaded outer end, a shoulder affixed to said shaft in spaced relation to said outer end, a handle removably mounted on the inner end of said shaft, an inner plate surrounding said shaft and abutting said shoulder, an outer plate surrounding said shaft adjacent the outer end thereof, said plates each having a plurality of radially extending slots, a plurality of mandrel-forming segments each provided with a bushing-engaging rib adjacent the inner end plate, a pintle extending from each end of each segment and receivable in one of said slots, a compression spring interposed between each adjacent pair of segments, a guide pin affixed to each segment, each segment having an opening therein receiving the pin of an adjacent segment, and a nut threaded upon the outer end of said shaft and abutting said outer plate.

*2. A bushing knocker and installer comprising a handle, a plurality of mandrel forming segments, each segment having adjacent to one end a transverse stop rib of enlarged radius, first abutment means positioned adjacent to the ends of said segments having said ribs and being substantially co-extensive in radius therewith, second abutment means positioned adjacent to the other ends of said segments and substantially co-extensive in radius therewith, threaded shaft means connecting said handle and said first and second abutment means whereby said first and second abutment means may be moved toward each other with the mandrel forming segments therebetween to engage and maintain said mandrel forming segments in the desired relationship to each other, projection and slot means interengaging said second abutment means and said segments and permitting radial movement of said segments but preventing circumferential movement thereof relative to said abutment means, means interengaging said segments and tending to hold said segments in assembled relationship in which the segments are equidistant to each other and to said shaft, and means operative to move said mandrel forming seg-*

*ments outwardly from said shaft a limited amount whereby the outer dimension of said mandrel may be varied.*

References Cited in the file of this patent or the original patent

UNITED STATES PATENTS

| | | |
|---|---|---|
| 291,282 | Blue | Jan. 1, 1884 |
| 1,045,287 | Henderson | Nov. 26, 1912 |
| 1,343,431 | Canty | June 15, 1920 |

| | | |
|---|---|---|
| 1,530,866 | Wakefield | Mar. 24, 1925 |
| 1,705,789 | Steirly | Mar. 19, 1929 |
| 1,879,335 | Kulp et al. | Sept. 27, 1932 |
| 1,958,330 | Beard | May 8, 1934 |
| 1,981,656 | Masters et al. | Nov. 20, 1934 |

FOREIGN PATENTS

| | | |
|---|---|---|
| 507,683 | Great Britain | June 20, 1939 |